Feb. 1, 1938.  C. F. DAVIS ET AL  2,107,144

DOWELED SLAB

Filed Dec. 12, 1933  5 Sheets-Sheet 1

INVENTORS
CLARKE F. DAVIS,
JOHN G. BRUSH,
BY ROBERT H. PECK,
Ellis S. Middleton ATTORNEY.

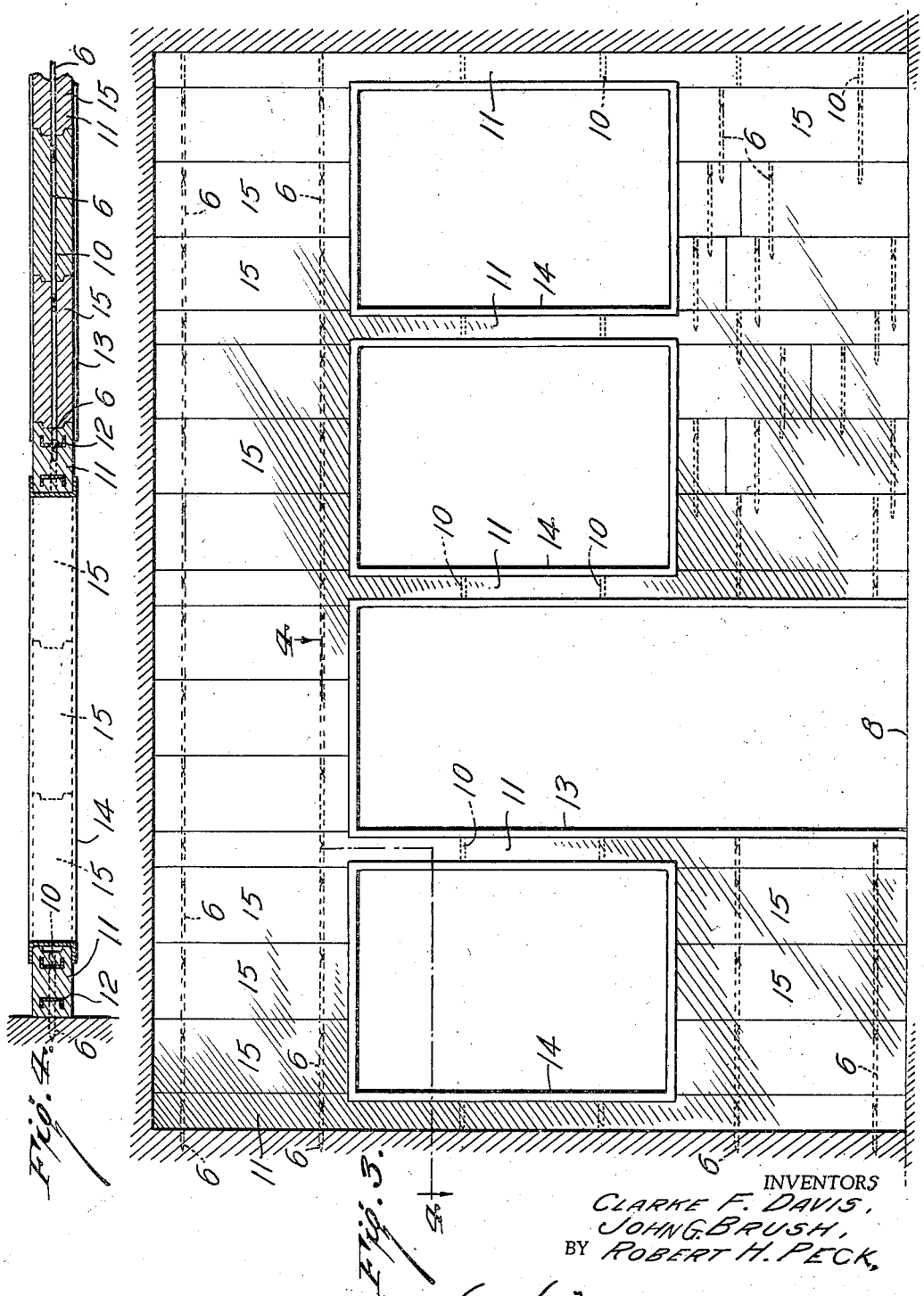

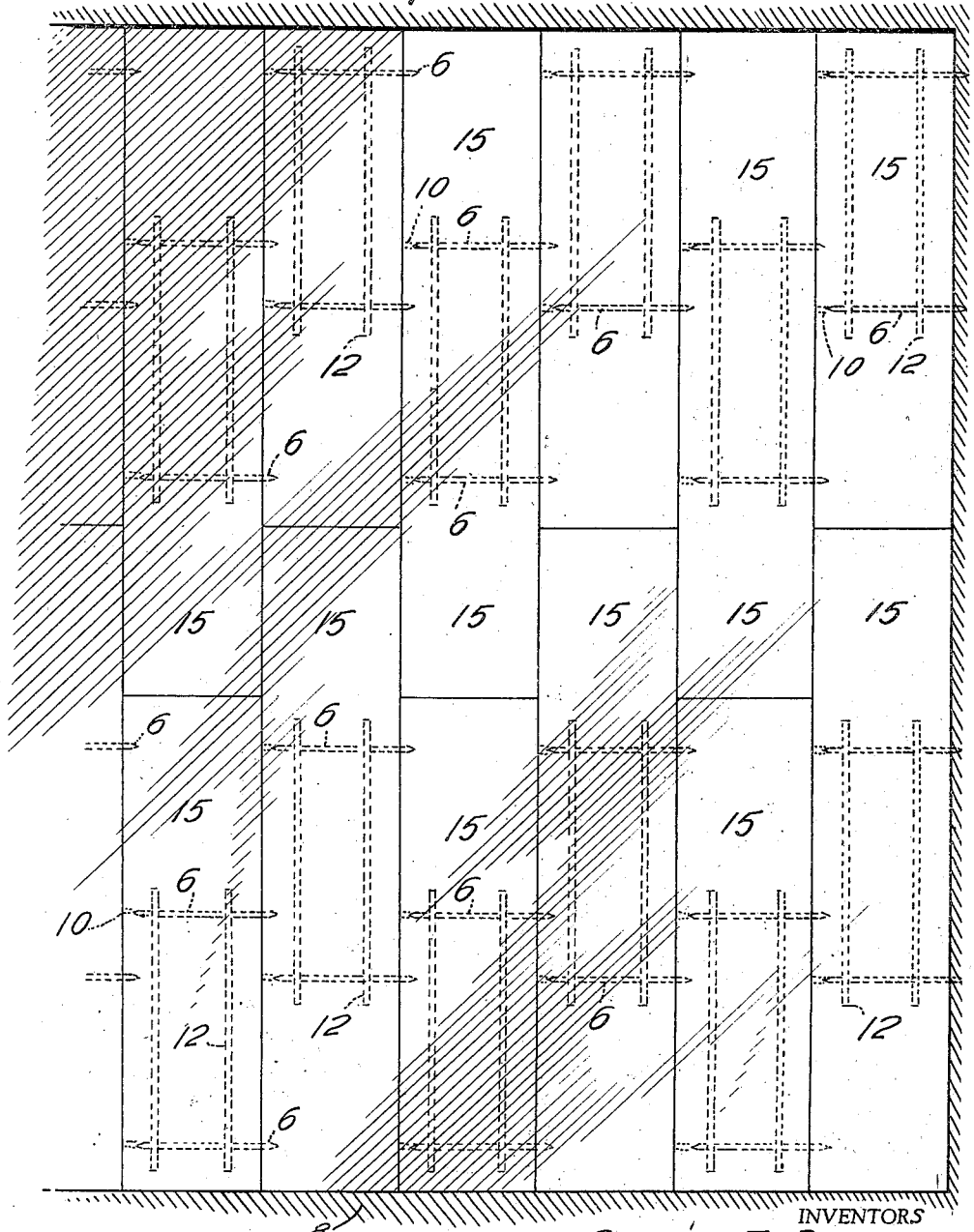

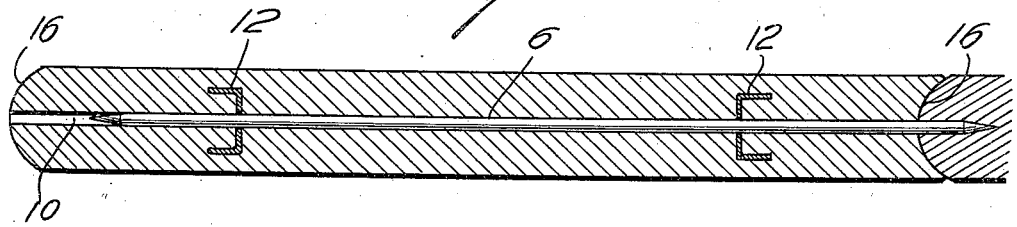
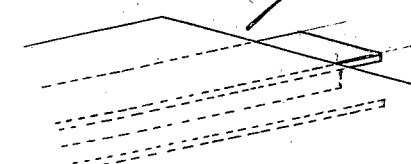
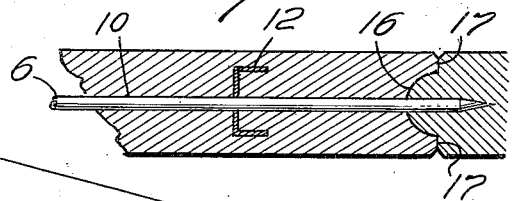
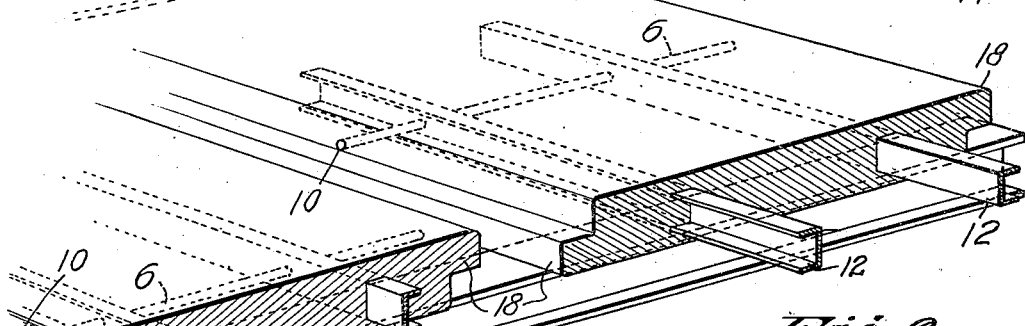
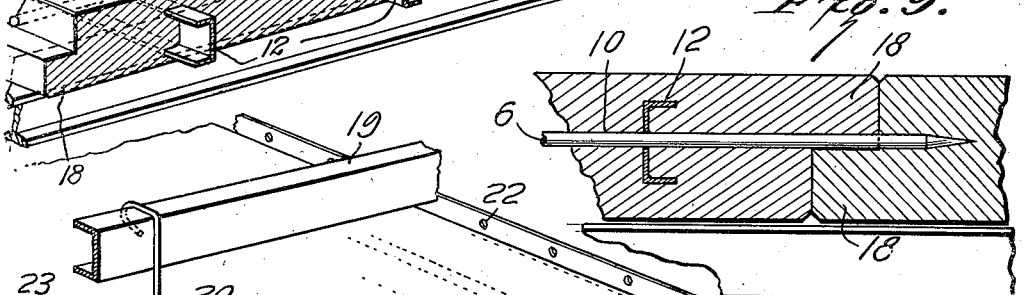
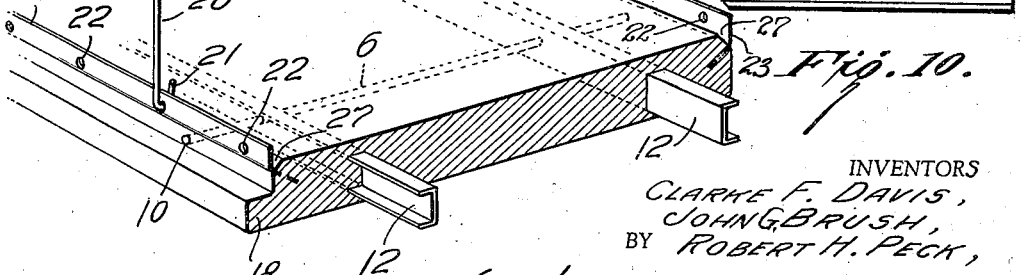

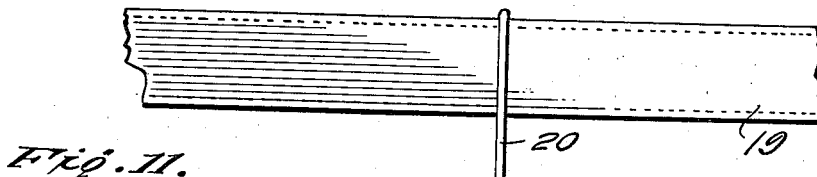
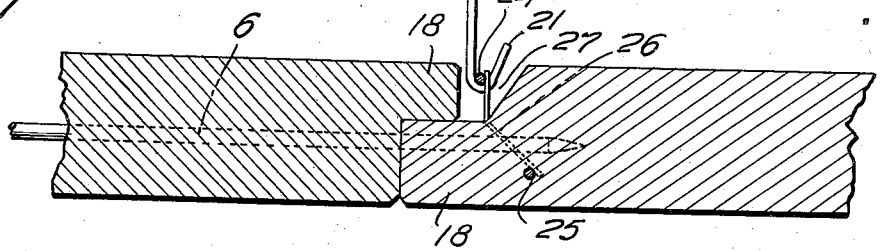
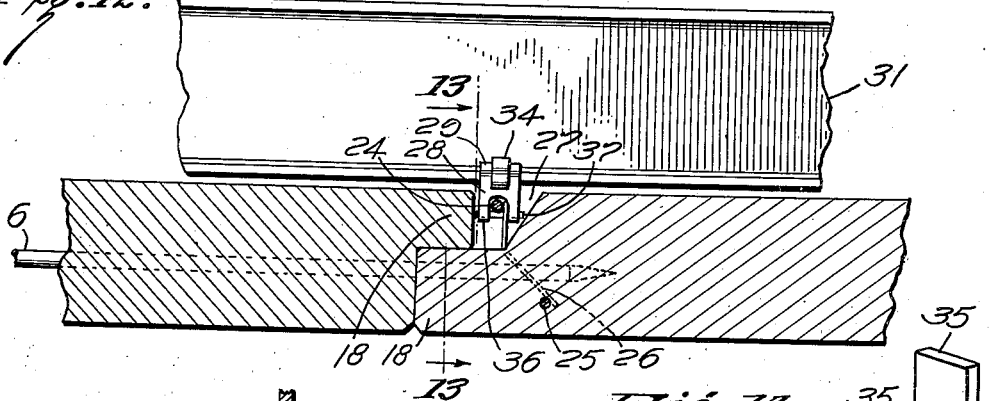
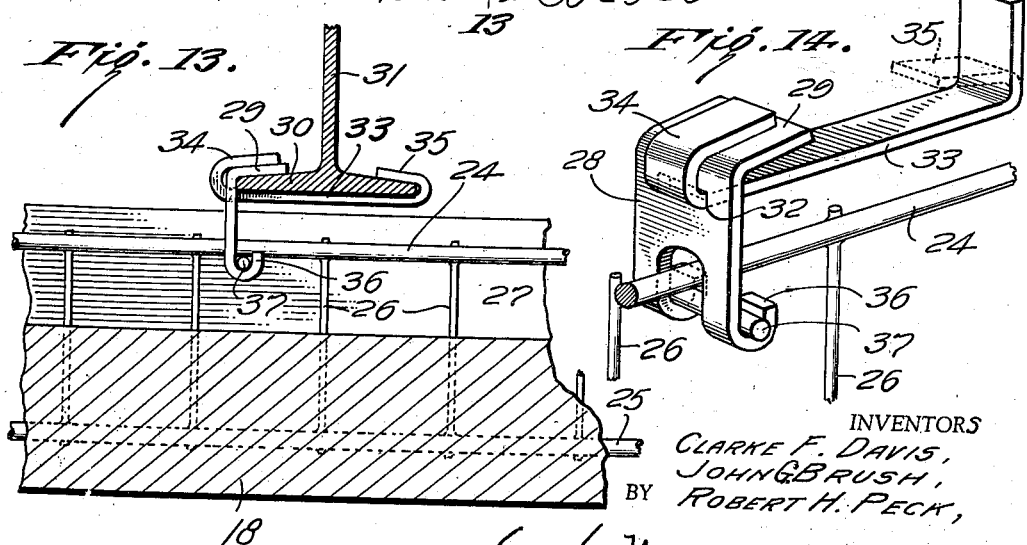

Patented Feb. 1, 1938

2,107,144

UNITED STATES PATENT OFFICE

2,107,144

DOWELED SLAB

Clarke F. Davis, Short Hills, and John G. Brush, Westfield, N. J., and Robert H. Peck, West New Brighton, Staten Island, N. Y., assignors, by mesne assignments, to American Cyanamid & Chemical Corporation, a corporation of Delaware Application December 12, 1933, Serial No. 702,008

18 Claims. (Cl. 72—68)

The present invention relates to a precast slab of set cementitious material and to building constructions embodying such a slab or slabs.

The principal object of the invention is the provision of a slab which may be incorporated into a building construction and suitably tied to a neighboring slab without the use of plaster or the like, yet which construction may be readily dismantled without undue injury to the slabs.

Another important object of the invention is the provision of a slab with reinforcements therein, which reinforcements may be utilized as a tying or doweling means between slabs where desired.

Another important object is the provision of a slab which may be made cheaply, of dimensions and weight capable of being handled readily by two men, of a material which can be easily sawed to reduce the size of the slab as circumstances may demand, and which may carry reinforcements so arranged that there is a substantial area at the end of each slab, either free of reinforcement or from which the reinforcement therein may be readily removed so that when a slab of lesser length or width is desired, the full size slab may be readily sawed or cut without the reinforcements offering resistance thereto, which severed pieces may then be used to piece out the area into which the slabs are being incorporated.

Another important object is the provision of a slab provided with inter-engaging edge portions, serving to align the several slabs during erection.

Still another object of the invention is the provision of a slab having lateral reinforcements cast therein which may be readily partially or totally removed therefrom, said reinforcements being so located within the slab that severance of the slab into several pieces will result in each portion carrying its own reinforcement.

Still another object of the invention is the provision of a slab in which the lateral reinforcements support and locate the longitudinal reinforcements and vice versa during the molding or casting operations.

Still another important object is the provision of specific types of floor and roof decks, walls and ceilings made of or including precast slabs.

To this end the invention in its broadest aspect contemplates a precast slab having reinforcements cast therein so that when two slabs are erected together the reinforcement in one slab may be partially driven therefrom and into the neighboring slab to tie the two together. This principle may be modified and enhanced by adding thereto longitudinal reinforcements, which may extend the full length of the slabs or in part thereof. In this way slabs of extreme lengths may be made of comparatively weak cementitious material such as gypsum, with or without admixtures, which slabs are handleable without breaking, due to such construction. In some instances the invention contemplates the inter-engagement of the lateral and longitudinal reinforcements such as penetration of the latter by the former. Such a construction is of particular advantage in the molding operation because the one reinforcement properly locates and supports the other during the casting. The invention further contemplates the arrangement of the reinforcements in such a manner that either no reinforcement occurs at certain areas where reinforcements are not needed, or the reinforcements may be completely removed from that area so as to offer no resistance to sawing or cutting. In other aspects the invention contemplates the specific forms of slabs, their manner of use, and the building constructions embodying them substantially as shown.

The invention further contemplates the novel combination, construction and arrangement of parts as more fully hereinafter described and shown in the accompanying drawings.

In the drawings—

Fig. 3 is a side elevation of a wall constructed of the slabs of this invention with door and window frames therein.

Fig. 4 is a sectional view along the line 4—4 of Fig. 3.

Fig. 5 is a view of a wall showing the advantages of the reinforcement-free area in the slabs.

Fig. 6 is a sectional view showing a modified tongued and grooved slab with the arrangement of reinforcements therein.

Fig. 7 is a fragmentary sectional view showing a modified slab inter-engagement.

Fig. 8 is a perspective view partly in section showing the method of tying slabs together as in a floor or roof deck.

Fig. 9 is a fragmentary sectional view of ship lapped slabs tied together.

Fig. 10 shows one form of slab when embodied in a ceiling.

Fig. 11 is a side elevation partly in section showing a modified ceiling slab.

Fig. 12 is a view similar to Fig. 11, illustrating the hanging of such slabs from the bottom of a beam or support.

Fig. 13 is a view along the line 13—13 of Fig. 12.

Fig. 14 is a perspective detail of the hanger of Figs. 12 and 13.

Figure 2:
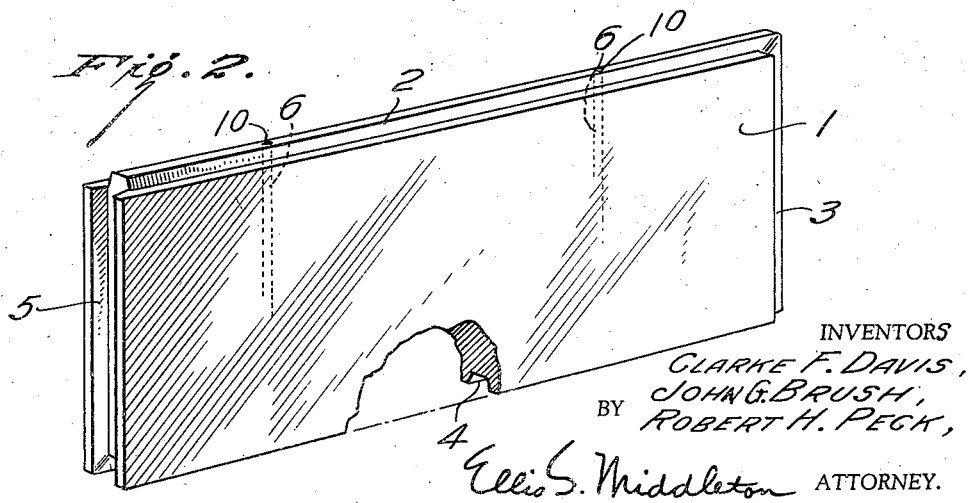
Fig. 2 is a perspective view of one embodiment of a slab.

Referring now more particularly to the embodiments illustrated, there is shown in Fig. 2 in perspective a typical slab embodying the invention. This slab is composed of a cementitious body 1 of any desired material which will hold its form upon setting, compression, baking or the like and with or without admixtures and fillers. It is provided on one longitudinal and one lateral edge with tongues 2 and 3, and on the opposite edges with corresponding and complementary grooves 4 and 5 respectively. While the tongues and grooves there illustrated are shown as composed of peripheral planes, yet obviously such outlines may be surfaces of revolution as for instance as shown in Fig. 6, or a combination of planes and surfaces of revolution as shown in Fig. 7. This tongued and grooved inter-engagement assists materially in aligning the several slabs during erection.

Figure 1:
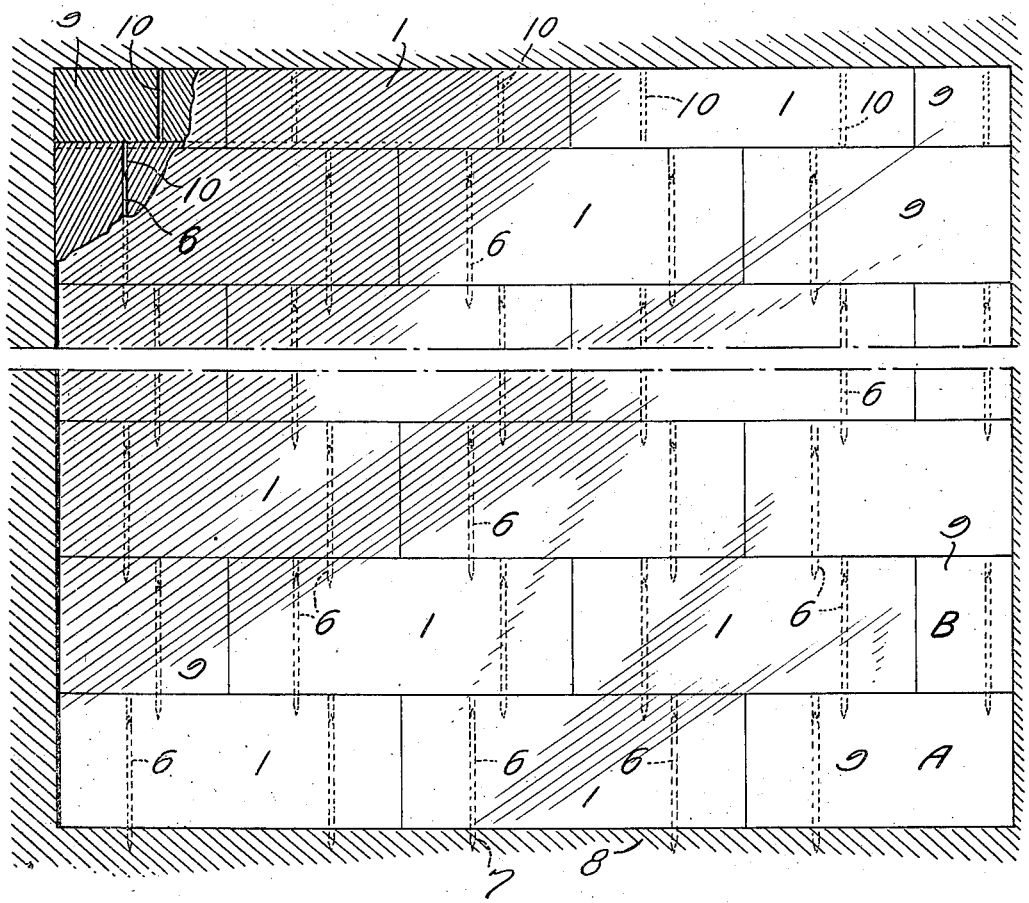
Fig. 1 illustrates a dry wall built of slabs of this invention.

Cast within the slab are a series of lateral reinforcements 6 preferably of an extent co-extensive or equal to the lateral width of a slab so that the ends of the reinforcement are discernible or accessible at or near the edges of the slabs. For instance, the ends of the reinforcements 6 are clearly shown at the surface of the tongue 2 in Fig. 2. Obviously any number of these reinforcements may be used, dependent upon the dimensions of the slab 1. As shown in Fig. 1 these slabs may, for instance, have dimensions somewhat similar to the slabs now known in the trade as partition tile, that is, substantially 3 inches x 15 inches x 30 inches. In such cases two such reinforcements will be found sufficient, although more can be added where circumstances demand.

After one tier of slabs has been laid, such for instance as the tier marked A, a nail punch or similar instrument may be laid against the upper end of the reinforcement 6 and a hammer used to partially drive the reinforcement out of the slab and into the base support. The end of the reinforcement thus driven from the slab is indicated at 7 as penetrating the base or floor material 8. In this way the tier of slabs A are not only locked together as by means of the tongued and grooved ends thereof, but they are positively and mechanically locked to the floor 8 by the projecting end of the lateral reinforcements which serve as dowels.

A second tier of slabs B is then erected on top of the tier A and the reinforcements similarly treated to dowel the two tiers together. Each succeeding tier is similarly treated, with the result that the entire wall is very effectively doweled together without the use of plaster or the like.

Experiments have conclusively demonstrated that these reinforcements may consist of metal rods placed in the slab during the molding operation and that the bond between the slab body and the reinforcement is not so great that it cannot be broken during the driving out operation. Even though the initial bond is so broken, there is still sufficient frictional engagement between the slab and the reinforcement to prevent accidental separation of the two. If the wall of Fig. 1 is to be dismantled, one slab may be pulled from the neighbor to which it is doweled by exerting force in an upward direction. The dowel may then be driven back into the slab and the slab used again as above set forth.

The bond between the dowel and reinforcement and the slab body into which it is cast, may be modified to make the removal of the former easier or more difficult. For instance, the rods or reinforcements may be dipped in oil prior to casting, in which event a minimum bond will exist between the surface thereof and the cast body of the slab. Where it is desirable to increase the bond, the dowel or reinforcement may be mechanically roughened or it may be dipped in a material such as an acid which will attack the surface thereof and cause corrosion or chemical union between the surface of the reinforcement and the slab body, as the case may be.

In order to assist the penetration of the driven end 7 of the reinforcement, these ends may be pointed as shown in Figs. 6 and 7, although this is not necessary.

In only a few instances will an even number of slab units correspond to the height and width of the wall being erected. In other cases it will be necessary to cut or break the slab to the desired size. Inasmuch as the reinforcements shown in Fig. 1 extend laterally of the slab, it will be clear that a slab may be readily sawed in that direction to make a piece of any desired size. Such a cut slab is shown at 9.

Fig. 2 shows the top tier of slabs as being of a lateral width less than the remaining slabs. In order to cut these slabs without the metal reinforcement offering any resistance to the cutting operation, it will be found desirable to first completely remove the dowels therefrom. While this operation leaves a hole 10, yet this is of no moment, particularly as such slab portions occur at the top of the wall where a minimum amount of strength is necessary. The top or end tier may, therefore, be wedged in place as by means of wooden wedges or the like.

Fig. 3 illustrates a typical wall in which the slabs are erected vertically rather than horizontally as shown in Fig. 1.

In this typical wall, two types of slabs are used, a mullion slab as shown in section at 11 in Fig. 4, and in plan in Fig. 3. These mullions preferably are made of a length equal to the height of the wall to be erected, and of a width to suit the circumstances. It is desirable, of course, that the total weight of a slab be such that it may be readily handled by two men and such is the case in the mullions of Fig. 3. They are, therefore, considerably narrower than the filler or intermediate slabs 1, which may be of the same general construction as shown in Fig. 2.

Inasmuch as the mullions are of a considerable length, it will be found desirable to longitudinally reinforce such slabs. These slabs, therefore, contain such reinforcements as structural elements 12 extending preferably the entire length of the slab. While two such longitudinal reinforcements are shown, yet in some instances one will be found sufficient, while on the other hand as many more may be placed therein as is necessary to give the requisite strength. As shown, these longitudinal reinforcements 12 consist of light channels but on the other hand, they may be made of angles suitably attached together as by riveting or welding to produce substantially the same shape. These mullions likewise include the lateral reinforcements or dowels 6 which are adapted to be driven into the adjacent slabs as described in the case of the slab of Fig. 2.

In the casting operation it has been found preferable to pass the lateral reinforcements 6 through holes provided in the channels 12 and to support the ends of the lateral reinforcements 6 in the mold sides. This, therefore, definitely positions the longitudinal reinforcements in the proper location and prevents any undue movement thereof during the pouring or casting of the slab body.

In the wall of Fig. 3, it is to be noted that the door frame 13 and the window frames 14 are held between the elongated mullions 11 and secured thereto by any desired means. This construction is of advantage by reason of the fact that the mullions extend between the floor and the ceiling and may be wedged or otherwise secured thereto and also because the mullions are longitudinally reinforced and are of a load sustaining character. Between the mullions 11 are the filler slabs 1 erected vertically and doweled to each other and to the mullions wherever necessary and in the manner described for the slab of Fig. 2.

The slabs above the door frame and above and below the window frames may be cut laterally to fit that space without difficulty, due to the fact that they contain no longitudinal reinforcements.

The above system, therefore, provides a very efficient and standardized method of construction, particularly where the door and window frames are made in widths which are multiples of the slab widths. No particular type of door and window frames are illustrated as that forms no part of the present invention.

The slabs may be staggered as with a break joint arrangement or not, as desired. If not, the dowel in one slab will enter the hole in the previously erected slab and from which its dowel has been partially driven.

A very advantageous construction results from the use of the slabs shown in Fig. 5. There the same lateral or doweling reinforcements are illustrated, but the longitudinal reinforcements do not extend the full length of the slabs but on the contrary terminate short of the ends so as to provide an area 15 at the ends of each slab free of reinforcements. This is of particular advantage because in erecting the wall of Fig. 5 the slabs may be readily sawed laterally through this free end area to provide pieces which completely fill out the wall area with maximum ease, which would not be the case should the longitudinal reinforcements extend the full length of the slab as for instance is the case with the mullions of Fig. 3.

While Fig. 5 is essentially a wall construction, yet obviously it may also constitute a floor or roof deck as the case may be, the figure being provided merely for the purpose of illustration of slabs in which a free end area occurs, thus permitting cutting of the slabs with minimum reinforcement interference.

Fig. 6 illustrates clearly the method of doweling together two adjacent slabs in any kind of a construction by means of the partially driven out dowels or lateral reinforcements. This slab is of a width greater than those of the mullions of Fig. 3 and perhaps illustrates the slab width as used in the construction of Fig. 5.

The inter-engagement of the slab edges of Fig. 6 is shown to constitute a surface of revolution 16 so as to assist in aligning the slabs.

Fig. 7 shows a modified form of edge in which the interlock or inter-engagement between slab edges is constituted by a surface of revolution 16 and a plane surface 17. Obviously in any of the constructions heretofore described in the above types of slab, any of the inter-engagement designs may be used.

Fig. 8 illustrates a type of floor or roof deck using slabs having both lateral and longitudinal reinforcements where, however, a ship lap edge 18 is provided on each slab rather than the tongue and groove of Figs. 2, 6 and 7. This may be found to be desirable in some instances, although where walls are used, the tongued and grooved arrangement of the former figures will probably be preferable.

Fig. 9 shows the method of doweling together of two such slabs as shown in Fig. 8 and the location of the dowel with regard to the ship lap.

Ceilings of the precast slab type have heretofore offered some difficulties in the matter of perfect alignment. For instance, where such a ceiling consists of slabs individually hung or even ship lapped together on the edges, they do not always maintain perfect alignment if upward or downward pressure is brought to bear on one slab. By using the dowel arrangement herein described, the slabs are definitely united together so that there is a distribution of pressure if applied to the bottom of any one slab or a distribution of load if it occurs on the top of any one slab, through that slab to those adjacent.

In the ceiling of Fig. 10 in which but a single slab is illustrated for the sake of clearness, the overhead support is shown at 19 of any suitable type, over the top of which a hanger 20 engages, the bottom portion of which is formed into a hook 21 which penetrates an aperture 22 in a hanging element 23 partially embedded in the slab and partially extending therefrom. A similar hanging element 23 at the opposite edge enables this slab to be hung as one of an initial row in which the right-hand edge may abut the wall. The next row of slabs will, of course, not have two such elements 23 but on the contrary only one, such as shown in Figs. 11 and 12.

In erection, an initial series of slabs are placed as shown in Fig. 10 with the right hand longitudinal edge thereof supported in any desired manner, such for instance as by the hanging element 23 at the right-hand edge. The next row of slabs, each with but a hanging element at one longitudinal edge only, is placed in position with the ship lap 18 at the right-hand end resting upon the ship lap 18 at the left-hand end of the previously erected slab. The hanger 20 is then placed through the nearest aperture 22 and the upper end of the hanger looped over the support 19. After this has been done, the dowel or lateral reinforcement 6 is driven from one slab into the other, as shown in Fig. 11.

A somewhat modified form of hanging element is shown in Figs. 11, 12, 13 and 14, which is made necessary by some building conditions in which a substantially continuous available perforation 22 would be desirable in order to pick up the hanger at any point. While in Fig. 10 the perforations 22 are spaced apart a substantial distance, yet it will be apparent that in some cases these perforations should be closer together than could ordinarily be permitted and still maintain the requisite strength in the hanging element. In such case, the mesh of Figs. 11, 12, 13 and 14 will be found desirable for they provide in effect a substantially continuous aperture which may be engaged by the hanging element at any point. Either one or both longitudinal edges may carry this hanging element.

In Fig. 11 a section of mesh is shown consisting of two longitudinal wires 24 and 25 connected together by laterals 26, the lower longitudinal 25 and that portion of the lateral 26 attached thereto being embedded in the slab during the casting operation. The upper portion of the lateral 26 and its longitudinal 24 project from the slab preferably within a recess 27 formed between slabs when those slabs are erected together. In erection, the hook 21 of the hanger 20 is made to engage the upper longitudinal 24 and the upper end of the hanger 20 passed over the support 19 as before. The use of mesh as the hanging element is also desirable because in driving the dowel 6 from one slab into another, it offers no resistance to the penetration thereof, particularly if the end of the dowel is sharpened. It will be apparent that in the strip hanging element of Fig. 10, if the embedded element were extended much below the point shown therein, the dowel of the next adjacent slab in being driven thereinto would strike the lower end of the strip, which would thereby limit the distance to which the dowel could be driven. Such is not the case, however, in the arrangement of Fig. 11.

Figs. 12, 13 and 14 illustrate a suitable hanger for hanging ceiling slabs above described from the bottom of a beam or support of one kind or another, particularly where it is desired to place the ceiling slabs as close to the bottom of the overhead support as is possible and still maintain a substantially vertical arrangement of the hanger. This vertical arrangement is, of course, extremely desirable because if it is is at an angle to the vertical, then the slab hung at that point will have a tendency to droop in time as the hanger tends to assume the vertical.

The hanger of Fig. 13 consists of a member 28 having an upset portion 29 adapted to overlie the bottom flange 30 of the beam 31 and provided with an aperture 32 adapted to receive an end of the strap 33, which end 34 may be bent over on top of the end 29 to secure the same in place. The body of the strap 33 is adapted to extend beneath the flange 30 of the beam and have the opposite end thereof 35 bent over on top of the flange 30, thus securing the hanger to the bottom flange of the beam or support. The lower portion of the element 28 is split to form two hook-shaped ends 36.

In erection, the hanger is applied to the beam as shown in Figs. 12 and 13, the ceiling slab moved into place so that the upper longitudinal 24 of the mesh passes between the split hook-shaped ends 36 of the hanger and a short rod 37 inserted beneath the longitudinal 24 and resting in the hook-shaped ends 36 of the hanger. In this way the slab may be placed as close to the bottom flanges of the beam as is permitted by the dimensions of the member 28 of the hanger. Such rod 37 may be placed in any location along the line of the slab except where the lateral wires 26 occur, which obviously is of such small dimension as to not offer any real objection.

The slabs herein illustrated are of particular advantage in that they may be made in uniform dimensions so as to constitute standard sizes. The reinforcements therein are, after casting, completely included within the periphery of the slab so that there is nothing projecting therefrom to be unduly bent or interfere with the shipping or handling operations. The hanging strip of Fig. 10 and the hanger mesh of Fig. 11 may be included entirely within the contour of the slab so that it will not be bent or mutilated during shipment or handling. Obviously, during shipment both the strip and the mesh may be bent down flat against the surface of the slab, and then in the field and just prior to erection, moved into an engageable location without detriment either to the hanging element or to the slab itself.

While the invention has been shown and described with particular reference to certain embodiments, yet these embodiments are shown merely for the purpose of illustration and the invention is not to be limited thereto but is to be construed broadly and restricted only by the scope of the claims.

We claim:

1. A slab of set cementitious material having therein a dowel substantially coextensive with one dimension of the slab and at least partly bonded to the cementitious material, said dowel being readily removable from the slab without injury thereto with a structural element in the slab at right angles to the dowel.

2. A slab of set cementitious material having a removable dowel therein with a structural element also in the slab at right angles to the dowel, the dowel penetrating the structural element.

3. A slab of set cementitious material having therein a removable dowel with a structural element in the slab at right angles to the dowel, the dowel penetrating the structural element, the slab having ship lapped edges.

4. A precast slab of set plastic material having at least one ship lapped edge in which a hanging element is partially embedded in the slab and projecting therefrom, the hanging element comprising mesh.

5. A building construction including two slabs erected with their edges adjacent, one slab having a dowel therein and partially driven therefrom into an adjacent slab, the latter being imperforate beyond the end of the dowel.

6. A building construction including spaced apart fixed supports, an elongated precast slab extending between said supports, other precast slabs having lateral reinforcements therein, said second slabs being of a length less than the first slab, the lateral reinforcements of the shorter slabs being partially embedded in the longer slab.

7. A floor or roof deck comprising spaced apart supports, precast slabs laid thereon and ship lapped together, each slab having a webbed longitudinal reinforcement, lateral reinforcements extending through the webbed reinforcements, said lateral reinforcements in one slab being driven into the neighboring slab.

8. A ceiling construction including spaced apart supports, ceiling slabs hung therefrom, each slab having a webbed longitudinal reinforcement, a lateral reinforcement penetrating the web, a hanging element partially embedded in the slab and projecting therefrom, the contiguous edges of adjacent slabs overlapping, and means connecting the hanging element with the support.

9. The ceiling of claim 8 in which the lateral reinforcement of one slab projects into its neighbor.

10. The ceiling of claim 8 in which the hanging element constitutes a mesh.

11. The ceiling of claim 8 in which the hanging element is located within a recess formed between the slabs.

12. The building construction of claim 6 with a longitudinal reinforcement in the said elongated slab extending substantially the full distance between the spaced apart fixed supports.

13. A ceiling construction comprising spaced apart supports, two ceiling slabs hung therefrom, each ceiling slab having a lateral reinforcement therein partially embedded in the adjacent slab, and a hanging element for each slab partially embedded in the slab and projecting therefrom, and means connecting the hanging elements with the support.

14. A ceiling construction comprising a support, two precast ceiling slabs below the support and longitudinally adjacent each other, one slab having a hanging element partially embedded therein and partially projecting therefrom near one edge, means connecting said element to said support, the second slab having a lateral reinforcement embedded therein and partially entering the first mentioned slab, whereby the second slab is partially supported by the first slab through the reinforcement of the second slab.

15. The ceiling of claim 14 in which the hanging element is mesh.

16. The ceiling of claim 14 in which the hanging element is mesh co-extensive with a slab edge.

17. The ceiling of claim 14 in which the end of the reinforcement of the second slab in the first slab penetrates the hanging element.

18. The ceiling of claim 14 in which the second slab is shiplapped onto the first slab and through the medium of the lateral reinforcement and the shiplap, is entirely supported at one edge by the first slab.

JOHN G. BRUSH.
CLARKE F. DAVIS.
ROBERT H. PECK.